US012455048B2

(12) United States Patent
Schaub

(10) Patent No.: US 12,455,048 B2
(45) Date of Patent: Oct. 28, 2025

(54) FASTENING DEVICE FOR FASTENING AN OXYGEN CONCENTRATOR

(71) Applicant: Markus Schaub, Wetzlar (DE)

(72) Inventor: Markus Schaub, Wetzlar (DE)

( * ) Notice: Subject to any disclaimer, the term of this patent is extended or adjusted under 35 U.S.C. 154(b) by 663 days.

(21) Appl. No.: 17/475,421

(22) Filed: Sep. 15, 2021

(65) Prior Publication Data

US 2022/0090741 A1 Mar. 24, 2022

(30) Foreign Application Priority Data

Sep. 24, 2020 (DE) ..................... 10 2020 124 951.9

(51) Int. Cl.
*F17C 13/08* (2006.01)

(52) U.S. Cl.
CPC .... *F17C 13/084* (2013.01); *F17C 2205/0188* (2013.01)

(58) Field of Classification Search
CPC ...... F17C 13/08; F17C 13/083; F17C 13/084; F17C 13/085; F17C 2205/0103; F17C 2205/0107; F17C 2205/0153; F17C 2205/0188
USPC ........................................................ 248/313
See application file for complete search history.

(56) References Cited

U.S. PATENT DOCUMENTS

| | | | | | |
|---|---|---|---|---|---|
| 2,536,797 | A | * | 1/1951 | Cooke | B60R 9/08 224/571 |
| 4,213,592 | A | * | 7/1980 | Lingenfelser | A62C 13/78 248/313 |
| D267,227 | S | * | 12/1982 | Ziaylek, Jr. | D8/373 |
| 4,944,434 | A | * | 7/1990 | Hamilton | B60R 9/02 224/571 |
| 6,842,922 | B2 | * | 1/2005 | Smeed | A61G 1/04 5/503.1 |
| 6,926,243 | B1 | * | 8/2005 | Ziaylek | A62B 25/00 248/307 |
| 8,052,209 | B2 | * | 11/2011 | Bostrom | A62B 25/00 297/188.04 |
| 8,191,848 | B2 | * | 6/2012 | McLoughlin | A62B 25/00 297/188.04 |
| 9,605,798 | B2 | * | 3/2017 | Brown | F24D 3/1016 |
| 11,242,956 | B2 | * | 2/2022 | Schaub | F17C 13/08 |
| 11,267,491 | B2 | * | 3/2022 | Evans | B61C 17/12 |
| 11,826,286 | B2 | * | 11/2023 | Schaub | A61G 12/005 |
| 2022/0090741 | A1 | * | 3/2022 | Schaub | A61M 16/101 |

FOREIGN PATENT DOCUMENTS

| | | |
|---|---|---|
| DE | 60 003 655 | 5/2004 |
| DE | 10 2012 005 668 | 9/2013 |
| DE | 10 2014 018 680 | 6/2016 |
| DE | 10 2017 102 282 | 8/2018 |

* cited by examiner

*Primary Examiner* — Jonathan Liu
*Assistant Examiner* — Guang H Guan
(74) *Attorney, Agent, or Firm* — Christopher W. Brody; Christopher B. Kilner; Millen, White, Zelano & Branigan, P.C.

(57) ABSTRACT

A fastening device for fastening an oxygen concentrator has a receiving body extending in a longitudinal direction. The receiving body has a facing side facing the oxygen concentrator and a facing-away side facing away from the oxygen concentrator. The receiving body has at least one receiving element on the facing side and at least one fixing device on the facing-away side. A securing device is arranged on the receiving body, wherein the securing device has a latching mechanism.

17 Claims, 6 Drawing Sheets

FASTENING DEVICE FOR FASTENING AN OXYGEN CONCENTRATOR

FIELD OF THE INVENTION

The invention relates to a fastening device for fastening a portable oxygen concentrator.

BACKGROUND ART

Portable oxygen concentrators for enriching oxygen from the ambient air are mainly used in the military field (air, water, land) and in emergency medicine. Oxygen concentrators are used in aviation, for example, in order to prevent a lack of oxygen in unpressurized cabins. In medicine, oxygen concentrators are used for patients who are routinely dependent on the enrichment of breathing air with oxygen. In this case, portable oxygen concentrators typically have a substantially cylindrical shape and weigh roughly 2 to 5 kg. Oxygen concentrators usually have a battery side (also filter side) and a connection side and are operated with the help of storage batteries for a period of application of up to eight hours.

An oxygen concentrator normally comprises a filter system designed to remove microorganisms and impurities from the incoming air. The purified air is then compressed and any nitrogen content therein is separated off by a filter membrane or a molecular sieve. The air in this case is usually enriched with oxygen according to the pressure swing adsorption process. The oxygen fraction is thereby increased to around 95%. In the following working step, the filter system is regenerated by expelling the adsorbed nitrogen.

It is known in the prior art for portable oxygen concentrators, gas cylinders or cylindrical containers in general to be fixed with the help of fastening devices. For example, the applicant's publication DE 10 2017 102 282 A1 describes a fastening device of this kind for fastening cylindrically shaped containers. In order to ensure the container is held securely, the fastening device has a receiving body which connects a support element situated in the upper portion, a fixing element for fixing the container in the fastening device and a supporting base element to one another. Designs with belt elements, which are used for fixing the container, are also known in the art.

The disadvantage of the fastening devices known in the art is that they are usually intricate to use and are not suitable for guaranteeing a simple, quick and reliable fixing that covers all manufacturers. It is often even necessary for tools and fastening devices to be added, in order to achieve a secure fixing of the container. In addition, it is regarded as a disadvantage that the fastening devices known in the art do not offer any fastening options for attaching the fastening device to a stretcher, standard rail or to an inner wall of a military vehicle, etc.

The problem addressed by the invention is that of providing an improved fastening device for the simple, quick and reliable fastening of an oxygen concentrator which overcomes the disadvantages of the prior art. The device should be easy to handle and capable of one-handed operation. In addition, the fastening device should be reliably fixable to suitable elements, such as standard rails or stretchers, for example.

SUMMARY OF THE INVENTION

In the case of a fastening device for fastening an oxygen concentrator, having a receiving body extending in the longitudinal direction which has a side facing the concentrator and a side facing away from the concentrator, the receiving body having at least one receiving element on the facing side, the receiving body having at least one fixing device on the facing-away side, it is provided according to the invention that a securing device is arranged on the receiving body, wherein the securing device has a latching mechanism.

The advantage of this is that the oxygen concentrator is inserted in the receiving body and is fastened there one-handedly and without tools by means of the securing device. The latching mechanism in this case guarantees safe and reliable securing. By means of the fixing device on the side which faces away, the fastening device can easily be positioned and fixed on rails (e.g. standard rails) or stretchers. The fastening device is therefore easy to use and, at the same time, can be mounted on suitable rail mounts, or the like, without much effort. In addition, the structure of the securing device and receiving elements according to the invention guarantees that oxygen concentrators from any manufacturer and of any type can be received and securely held.

In this case, the securing device according to a preferred embodiment has a clamping profile, wherein the clamping profile has an L-shaped design. The L-shaped design of the clamping profile means that the oxygen concentrator is at least partially enclosed in the secured state, which means that a better overall clamping effect is achieved.

According to a preferred embodiment, the securing device has a guide element, wherein at least one spring element and at least one linear guide are arranged in the guide element. By virtue of the linear guide, the clamping profile can be guided along a vertical axis within the guide element. The clamping profile lies on the spring element within the guide element. A downward movement of the clamping profile via the linear guide means that the spring element positioned in the guide element is consequently compressed and stores energy. When the securing device is released, or a slide which releases the latching mechanism is activated, the stored energy is then once again released in the form of a spring force, as a result of which a desired upwards movement of the clamping profile is achieved simply by means of the spring force.

The clamping profile preferably has a first leg, wherein the first leg is guided linearly in the guide element. The guide element, in which the first leg of the clamping profile is guided linearly, is advantageously used simultaneously as a protective cover or as a protective housing. In this way, the linear guide and the spring element are protected from outside influences, such as contamination or small parts, for example, which can lead to jamming when the oxygen concentrator is being fastened or the clamping profile moved.

In a preferred embodiment, the clamping profile has a second leg, wherein a slide is arranged on an upper side of the second leg. The second leg is oriented substantially perpendicularly to the linear-guided first leg and is particularly well-suited to receiving the slide and forming a latching mechanism associated therewith. The arrangement of the slide on an upper side of the second leg has the advantageous effect that the slide is easily accessible in each position of the clamping profile and can easily be actuated.

In this case, a plastic element is arranged on an underside of the second leg according to a preferred embodiment, wherein the plastic element has a contour adjustment corresponding to the surface of the concentrator. In the fastened state, the plastic element presses onto the surface of the oxygen concentrator and thereby reinforces the clamping action. The plastic element may be reversibly deformed in this case. By virtue of the contour adjustment, the bearing surface of the plastic element is enlarged and the fastening of the concentrator is further stabilized.

The slide is preferably connected to a tongue element, wherein the tongue element is guided linearly in the plastic element. The latching mechanism of the securing device is mainly produced by the tongue element. From a structural point of view, the bearing and guidance of the tongue element within the plastic element is particularly appropriate, since the plastic element both offers sufficient material and is arranged directly below the second leg. The fact that the slide is connected to the tongue element means that the latching mechanism can easily be released by moving the slide.

According to a further embodiment, the securing device has a closing element, wherein the closing element is provided with a lead-in chamfer, wherein the tongue element engages below the lead-in chamfer. The closing element, combined with the tongue element, forms the latching mechanism. The tongue element is guided during a downwards movement along the run-in or lead-in chamfer and moves away from the closing element along with the slide, until the lead-in chamfer ends. As soon as the tongue element has reached the level of the opening below the lead-in chamfer, the tongue element engages below the lead-in chamfer of the closing element.

The lead-in chamfer in this case is advantageously used as a guide element and makes it easier for the clamping profile to be pressed down. At the same time, an optional spring in the slide guide and the fixed connection between the slide and the tongue element mean that a pretensioning force is produced when the clamping profile is pressed down, so that the tongue element engages below the lead-in chamfer by virtue of the pretensioning force.

The securing device preferably has a cover element opposite the guide element, wherein the cover element is connected to the guide element and the receiving body. The cover element thereby stabilizes the securing device and at the same time protects the linear guide, and also the spring elements within the guide element from outside influences.

The receiving element advantageously has a hook-shaped design, wherein on an upper side, in particular, the receiving element has a bead for rubber inserts. The hook-shaped design of the receiving element gives rise to shape-adjusted receiving means, since the oxygen concentrators, as already discussed above, usually have a cylindrical body. On account of the hook shape, the receiving element may enclose the concentrator at least in part. Rubber inserts, which are not depicted further and which project approx. 2 mm beyond the edge, for example, and, in addition, are captured in the contour, are inserted in the beads. The rubber inserts are used to provide additional vibration protection and prevent the oxygen concentrator from slipping. In addition, the entire system is further projected by the projecting rubber inserts. In moved systems, such as in a vehicle, for example, the fastening device is primarily exposed to dynamic loads which are further reinforced by the own weight of the concentrator. This means that rattling noises and strong vibrations can occur which are advantageously prevented, or at least damped, by the rubber inserts.

The receiving element can preferably receive the concentrator in a contour-fitting manner. This improves the stability of the fastening and at the same time ensures an improved receiving means for the concentrator.

The receiving body preferably has a first end stop with an opening, wherein the first end stop has a substantially round shape. The first end stop is designed in such a manner that it is arranged on the battery side or filter side of the concentrator. The concentrators usually have front faces which are circular in shape. The opening has the advantageous effect that either reinforcing elements or adaptation elements can engage with the opening. It may be provided in this case that a projection of an upright reinforcing profile engages with the opening.

According to a further embodiment, the receiving body has a second end top, wherein the second end stop has a narrower design than the first end stop. The second end stop is designed in such a manner that it is arranged on the connection side of the oxygen concentrator. Tubes and cables may be situated on this side, which is why the narrower design of the end stop is particularly advantageous and space-saving. At the same time, the more narrowly designed end stop saves on material and reduces the own weight of the fastening device. In addition, the fastening device is thereby more flexible and compact overall for mobile use.

According to a preferred embodiment, the fixing device comprises a first and a second mounting profile, wherein the second mounting profile is guided linearly in the first mounting profile via a push rod clamping device. This enables the fastening device to be easily fastened to suitable rail elements, in particular standard rails. A particularly quick and easy actuation of the fixing device is achieved by means of the push rod clamping mechanism. In addition, it is advantageous that when a zero pressure point is reached, or when the zero pressure point is exceeded, a haptic feedback occurs and a firm fixing is thereby signalled.

In order to create further fixing possibilities, the receiving body according to a preferred embodiment comprises at least one suspension on the side facing away from the concentrator, wherein the suspension is mounted rotatably and can be fixed in at least three positions. The suspensions are particularly ideally suited for points which cannot be gripped by the fixing device. This gives rise to further fixing possibilities.

The suspension is preferably connected to the receiving body via a housing, wherein a spring pin and a securing nut are arranged in the housing. The housing, which is particularly produced from aluminium, on the one hand protects the relatively narrow cylinder of the suspension and, on the other hand, the spring pin and the securing nut, from external influences. A rotatable bearing can be achieved by the securing nut. The spring pin is, in particular, a ball pressure piece, and is particularly ideally suited for a bearing of this kind.

According to a preferred embodiment, the portion of the suspension located within the housing has three flat sides, wherein the spring pin rests against a flat side. The spring pin in this case is, in particular, a spring-loaded ball pressure piece and is particularly well-suited to a pivot bearing of this kind with three fixing positions. Level with the spring pin or the ball pressure piece, the suspension has three flat sides within the housing, so that it can adopt three positions. When the suspension rotates, the spring pin, or else the spring-loaded ball pressure piece, is guided along the flat side until an edge is overcome and the ball pressure piece rests against the next flat side and therefore moves into the next position.

In order to prevent slippage or scratching and, at the same time, to achieve better adhesive friction, the portion of the suspension located outside the housing is preferably substantially rubber-coated. The rubber-coating also suppresses rattling noises.

The receiving body preferably has a reinforcing profile, wherein a projection is formed on the reinforcing profile which engages with the opening in the first end stop. On account of the reinforcing profile, the fastening device can also be positioned and fixed upright. For example, this fixing variant can be used in confined spaces. The fact that the projection engages with the opening in the first end stop and the reinforcing profile is at the same time connected to the receiving body, wherein the reinforcing profile is, in particular, angled, means that a particularly stable hold is achieved. During fixing in an upright position, the reinforcing profile carries and supports the fastening device from an underside.

According to an optional embodiment, the receiving body has a power supply unit holder with a bracket and a base. This enables a power supply unit to be directly arranged on the fastening device. The bracket in this case secures the power supply unit on the base and the base acts as a supporting element.

In this case, the base preferably has at least one recess, wherein the recess is arranged on the side of the second narrow end stop. Cables or tubes can be fed through the recess. Because the recess is arranged on the side of the narrow second end stop, any cables and tubes can be fed towards the connection side of the oxygen concentrator.

The receiving body, along with the power supply unit holder, preferably creates a contour-fitting contact. This improves the fastening and prevents mechanical stress peaks on the contact faces.

In order to reduce the total weight of the fastening device and, at the same time, to simplify production, according to a preferred embodiment, the entire receiving body is made of a lightweight metal, in particular an aluminium alloy.

According to a further embodiment, the receiving body has two hook-shaped receiving elements, wherein the securing device is, in particular, arranged in the centre between the two receiving elements. This leads to an optimum force distribution and to an improved clamping and supporting effect. On account of this structural arrangement, an improved equilibrium of forces and a greater bending stiffness in the centre segment of the receiving body is achieved. The own weight of the concentrator that is received is thereby evenly deflected and does not lead to one-sided loads which could, in turn, become apparent in the form of a material deformation.

A compact design of the fastening device according to the invention is, in particular, achieved when the receiving body has a narrower design along the longitudinal direction towards the end stops than in a region of the securing device and receiving elements. In addition, this embodiment is weight-saving and material-saving. The more compact structure makes the fastening device more flexible for mobile application.

The receiving body preferably has fastening openings. Further elements can be fastened to the receiving body simply and reliably via the fastening opening through the addition of fastening means.

In order to reduce the own weight of the fastening device, it is preferably provided that the receiving body has material recesses in a region of the securing device and receiving elements. In this way, production cost savings are simultaneously made, as less material is needed.

The closing element is preferably made of a material with a resistant surface, in particular of high-grade steel. This enables the tongue element to be guided along the lead-in chamfer of the closing element, without leaving behind mechanical damage such as pressure or scratch marks on the closing element. The use of high-grade steel not only means that there is reduced wear, but also that the strength of the latching mechanism is increased.

The guide element is preferably made of a high-molecular thermoplastic, such as polyoxymethylene (POM), in particular. The use of a thermoplastic such as POM as the material simplifies production of the guide element. The guide element in this case can be produced simply and cost-effectively as an injection-moulded part. The incorporation of a linear guide in this case is likewise simplified.

Further features, details, and advantages of the invention resulting from the wording of the claims and from the following description of exemplary embodiments with the help of the drawings.

DETAILED DESCRIPTION OF THE INVENTION

Figure 1:
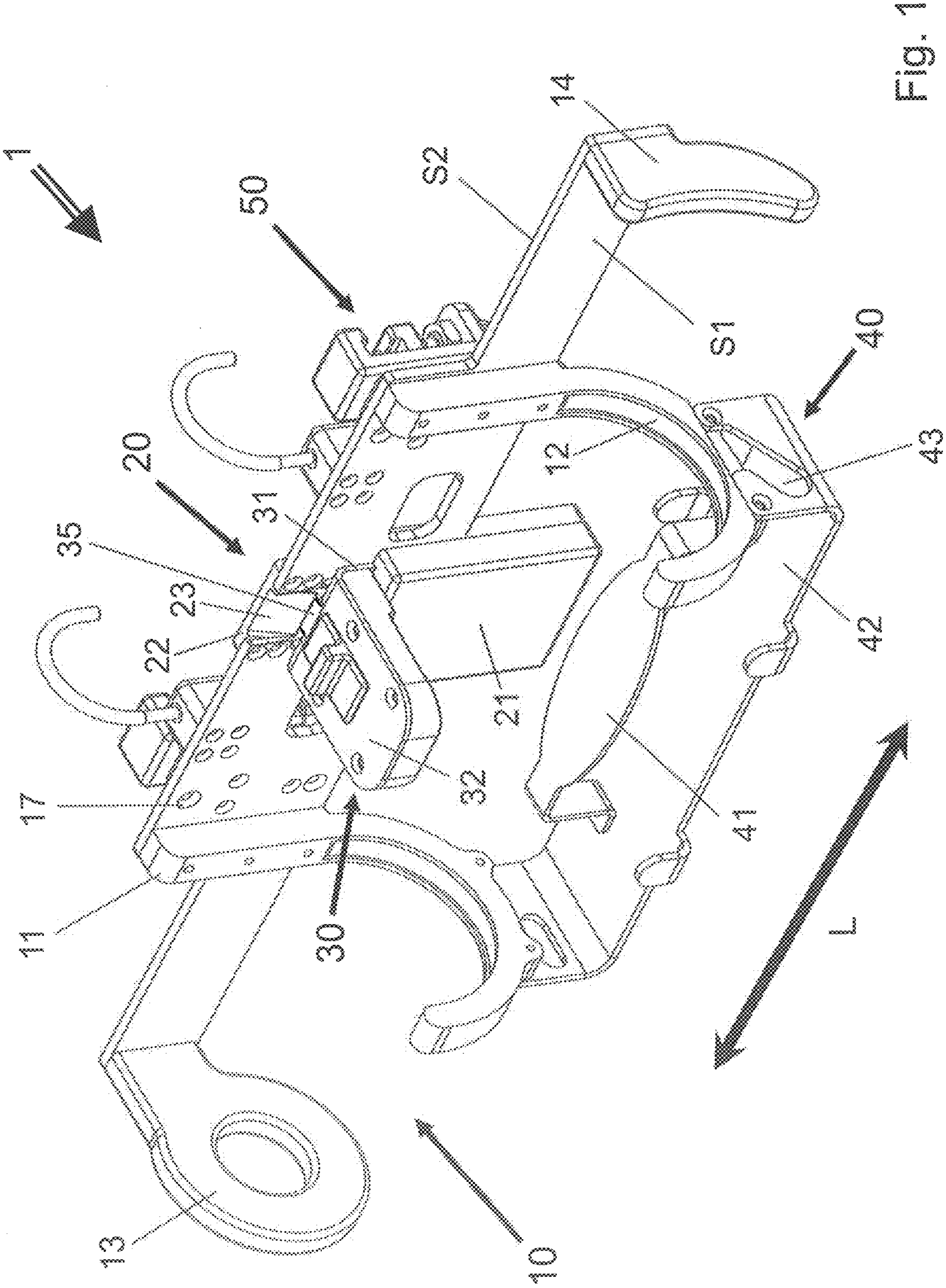
FIG. 1 shows the fastening device as a 3D view.

FIG. 1 shows as a spatial view a fastening device 1 for fastening an oxygen concentrator, which is not shown, with a receiving body 10 extending in a longitudinal direction L. The receiving body 10 has a side S1 facing the received concentrator and a side S2 facing away from the received concentrator. At least one receiving element 11 for receiving the concentrator is arranged on the facing side S1, wherein the receiving body 11 has at least one fixing device 50 for fixing to a suitable element, such as a standard rail, for example, on the facing-away side S2. In this case, the at least one receiving element 11 has a hook-shaped design and comprises a bead 12 for rubber inserts.

Since oxygen concentrators normally have a substantially cylindrical body, the hook shape of the receiving element means that a contour fit with the surface of the oxygen concentrator is achieved.

The receiving body 10 has a securing device 20 by means of which the oxygen concentrator received in the receiving elements 11 is secured to the receiving body 10. The securing device has a latching mechanism which comprises a tongue element 35, a closing element 22 and a slide/guide system. The closing element 22 has a lead-in chamfer 23, in order to guide the tongue element 35.

In this case, the securing device 20 according to a preferred embodiment has a clamping profile 30, wherein the clamping profile 30 has an L-shaped design. The clamping profile 30 has a first leg 31 and a second leg 32, wherein the second leg 32 is guided linearly in a guide element 21. For this purpose, a linear guide with spring elements is arranged within the guide element 21.

By means of a linear downwards movement of the clamping profile 30, the first leg 31 is pressed against the spring elements in the guide element 21, so that when the latching mechanism is released, a linear upwards movement of the clamping profile 30 is achieved by the pretensioning force of the spring elements.

End stops 13, 14 are formed on both front faces of the fastening device 1, wherein the end stop 13 has a circular opening.

An optional power supply unit holder 40 is arranged on an underside of the receiving elements 11, wherein the power supply unit holder 40 has a bracket 41 and a base 42. The power supply unit, which is not further represented in FIG. 1, rests on the base 42 in the inserted state and is Surrounded by the bracket 41. In this case, lateral tabs on the base 42 ensure that the power supply unit has a firm and reliable fixing. On the side of the narrow end stop 14, the base 42 has a recess 43 through which cables and tubes, which are not further represented, can be fed. As further shown in FIG. 1, the receiving body 10 has fastening openings 17 for receiving fastening means and for attaching further elements.

Figure 2:
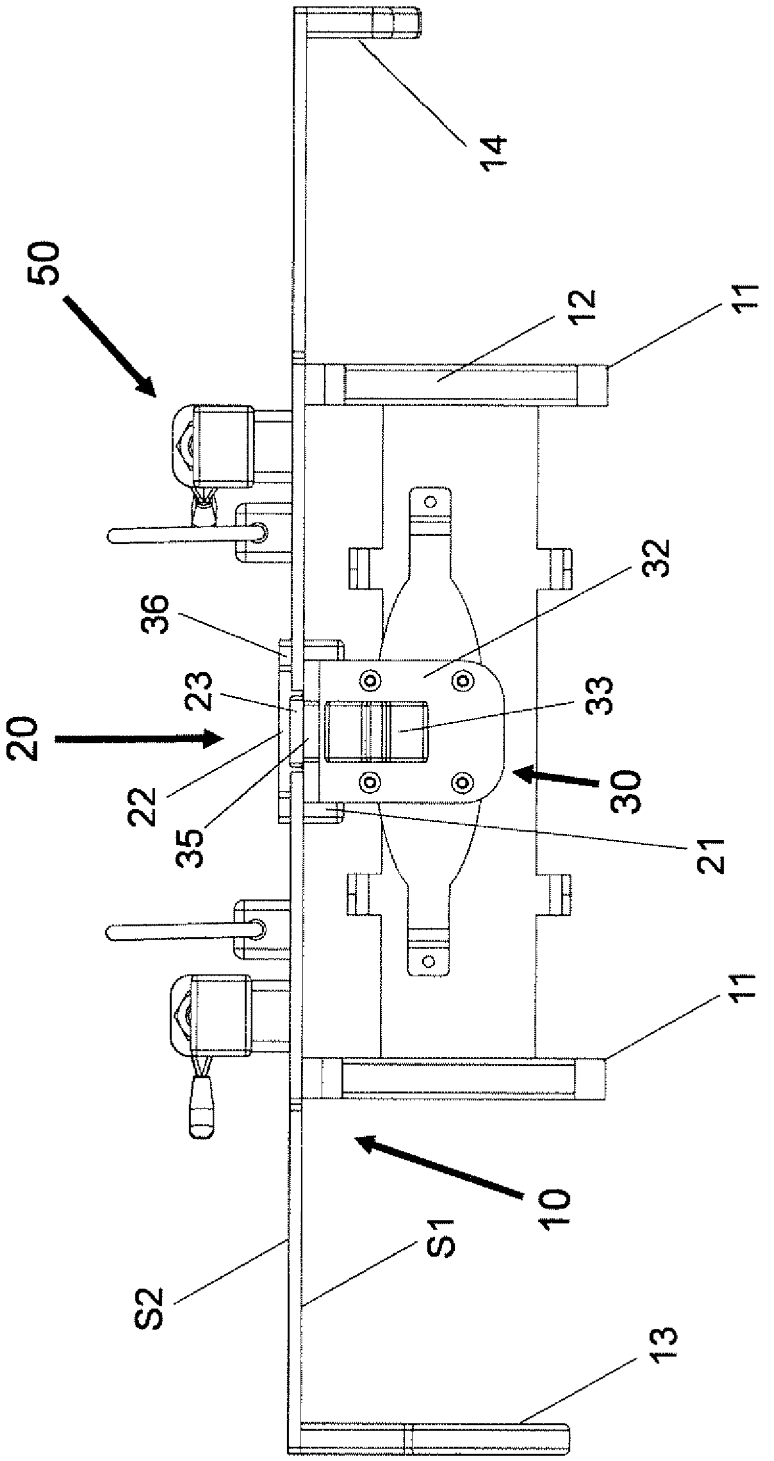
FIG. 2 shows the fastening device as a plan view.

The fastening device 1 is depicted in plan view in FIG. 2. In this case, the elements known from FIG. 1 are provided with the same reference signs.

The clamping profile 30 has a slide 33 on an upper side of the second leg 32. The slide 33 is connected to the tongue element 35. The tongue element 35 is guided and moved along the lead-in chamfer 23 of the closing element 22, and the slide 33 away from the closing element 22, through a downwards movement of the clamping profile 30. By moving the slide 33, a spring element which is not shown is pretensioned and causes the tongue element 35 to engage with an opening below the lead-in chamfer 23, as soon as the lead-in chamfer 23 has been overcome. A latched position in which the tongue element 35 engages with the opening is shown.

The guide element 21 has a cover element 36 for protecting against outside influences on the side S2 of the receiving body 10 facing away from the concentrator that has been received.

Figure 3:
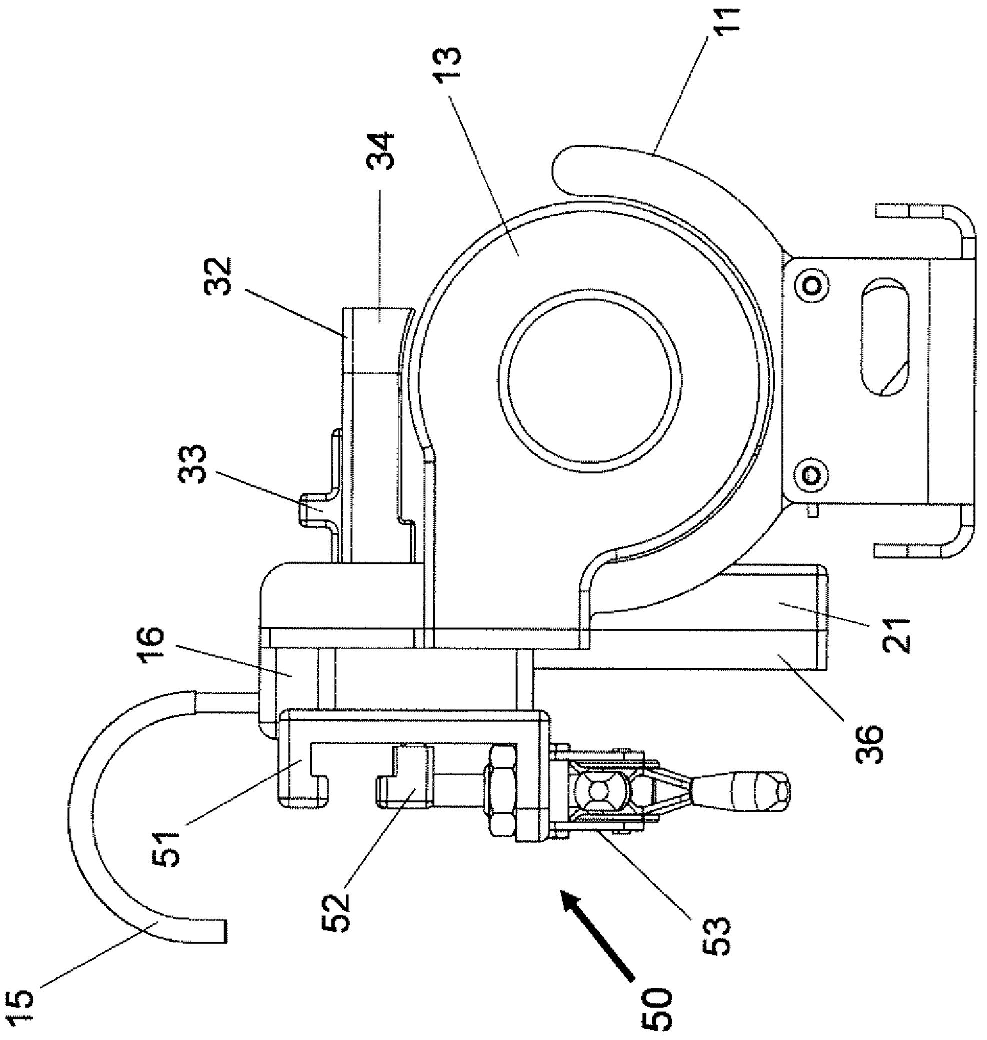
FIG. 3 shows the fastening device as a first side view.

In FIG. 3 the fastening device 1 is shown as a first side view from the perspective of the first end stop 13. In this case, the elements known from FIGS. 1 and 2 are provided with the same reference signs.

The second leg 32 has a plastic element 34 on an underside, wherein the plastic element 34 has a contour adjustment matching the customarily cylindrical surface of the oxygen concentrator. In the fastened state, the plastic element 34 presses onto the surface of the oxygen concentrator. The plastic element 34 may be reversibly deformed during this, on account of the material properties, thereby ensuring that the oxygen concentrator is mounted free from play.

The fixing device 50 comprises two mounting profiles 51 and 52, wherein the mounting profile 52 is guided linearly in the mounting profile 51. Linear guidance of the mounting profile 52 takes place by means of a push rod clamping device 53 which is arranged beneath the mounting profile 52. It is evident in this case that an intermediate element not specified in further detail is arranged between the mounting profile 51 and the receiving body (see also FIG. 2).

The receiving body also has a suspension 15, wherein the suspension 15 is mounted rotatably and can be fixed in at least three positions. The suspension 15 in this case is connected to the receiving body via a housing 16, wherein a spring pin and a securing nut are arranged within the housing. The portion of the suspension 15 located outside the housing 16 has a rubber coating.

Figure 4:
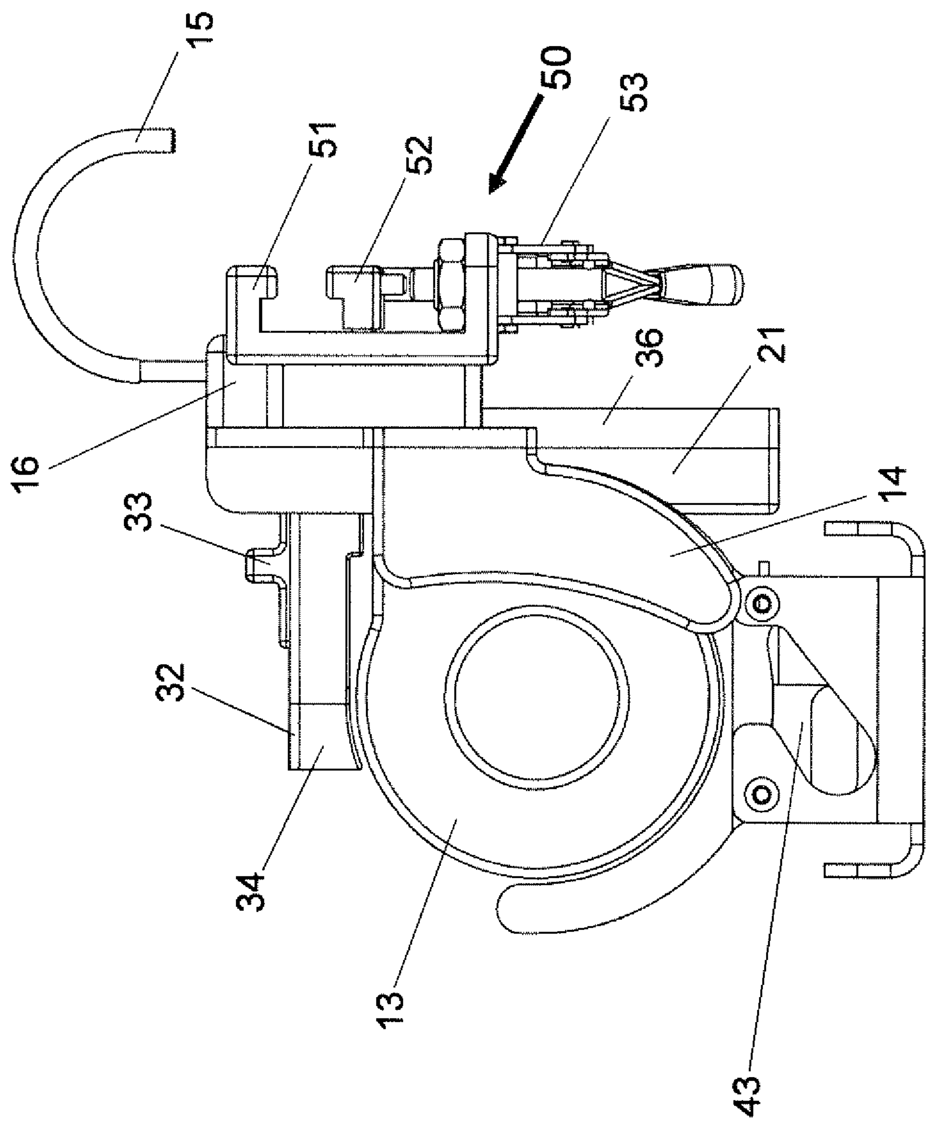
FIG. 4 shows the fastening device as a second side view.

The fastening device 1 is depicted in a second side view in FIG. 4 from the perspective of the second, narrower end stop 14. In this case, the elements known from FIGS. 1 to 3 are denoted using the same reference signs.

The second end stop 14 is narrower in design than the first end stop 13 and has no opening. Consequently, a free space is left for the guidance of tubes, for example. On the side of the second end stop 14, the base 42 has a recess 43 through which cables (not shown) can be guided.

Figure 5:
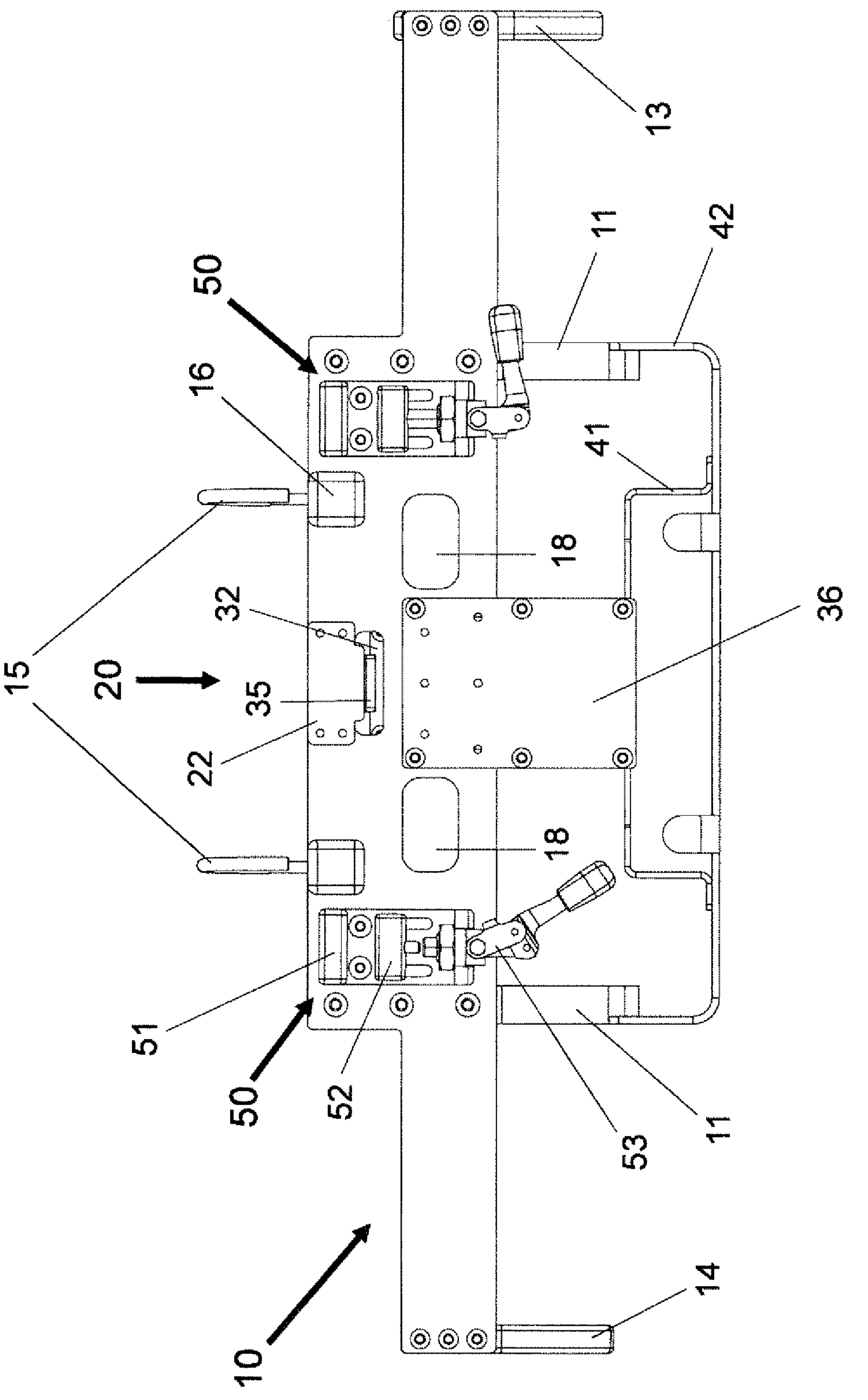
FIG. 5 shows the fastening device as a rear view and
FIG. 6 shows the fastening device with a reinforcing profile as a 3D view.

FIG. 5 shows the fastening device 1 as a rear view. In this case, the elements known from FIGS. 1 to 4 are denoted using the same reference signs.

FIG. 5 shows that the receiving body 10 comprises two receiving elements 11, two suspensions 15 and two fixing devices 50. The securing device 20 in this case is arranged centrally between the aforementioned elements. The receiving body 10 is configured to become narrower towards the end stops 13, 14 than in the centre region, where the securing device 20 is arranged.

In addition, the receiving body 10 has two material recesses 18, which mean that weight and material savings are made.

Figure 6:
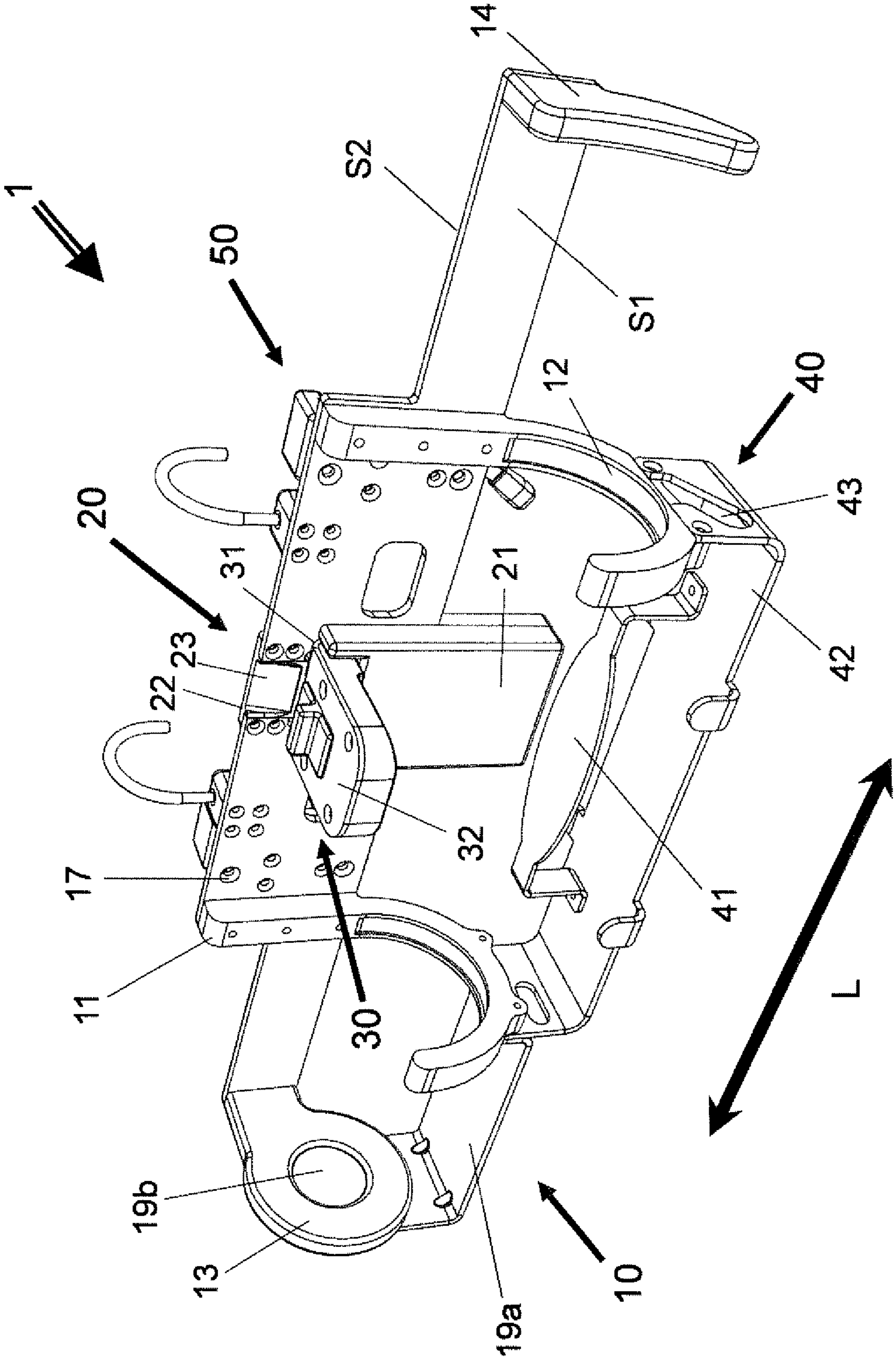

The fastening device 1 is depicted as a spatial view in FIG. 6. In this case, the elements known from FIGS. 1 to 5 are provided with the same reference signs.

The receiving body 10 has a reinforcing profile **19*a* which has an L-shaped design and a round projection 19*b*. The reinforcing profile is mainly used as an upright reinforcement and allows the fastening device 1 to be fixed vertically to rails provided therefor. In this case, the projection 19*b* engages with the opening in the first end stop 13 and thereby ensures a firm fit of the reinforcing profile 10 on the receiving body 10**.

The substantial individual parts of the fastening device, excluding the fixing device, the guide element and the closing element, are preferably produced from a lightweight structural material, in particular from an aluminium alloy. All sharp edges of the individual parts are rounded or chamfered in this case, in order to mitigate the risk of cuts when using the device.

The guide element is preferably made of a high-molecular thermoplastic material, in particular polyoxymethylene (POM). The closing element preferably has a material with a resistant surface and is particularly formed from high-grade steel.

A preferred field of application is military vehicles, military ships or military aircraft. However, other fields of application, such as emergency stretchers for ambulances or emergency helicopters, etc. are possible. The invention is not limited to one of the embodiments described above, but can be modified in a variety of ways.

All features and advantages emerging from the claims, the description and the drawing, including structural details, spatial arrangements and method steps, may be essential to the invention, both individually and also in a wide variety of combinations.

LIST OF REFERENCE SIGNS

L Longitudinal direction
S1 Facing side
S2 Facing-away side
1 Fastening device
10 Receiving body
11 Receiving element
12 Bead
13 First end stop
14 Second end stop
15 Suspension
16 Housing
17 Fastening opening
18 Material recess
**19*a*** Reinforcing profile
**19*b*** Projection

20 Securing device
21 Guide element
22 Closing element
23 Lead-in chamfer
30 Clamping profile
31 First leg
32 Second leg
33 Slide
34 Plastic element
35 Tongue element
36 Cover element
40 Power supply unit
41 Bracket
42 Base
43 Recess
50 Fixing device
51 First mounting profile
52 Second mounting profile
53 Push rod clamping device

The invention claimed is:

1. A fastening device (1) for fastening an oxygen concentrator, having a receiving body (10) extending in a longitudinal direction (L), the receiving body (10) having a facing side (S1) configured to face the oxygen concentrator in a received position and a facing-away side (S2) configured to face away from the oxygen concentrator in the received position, the receiving body (10) having two receiving elements (11) on the facing side (S1), the receiving body (10) having at least one fixing device (50) on the facing-away side (S2), wherein a securing device (20) for securing the oxygen concentrator adapted to be received on the two receiving elements is arranged on the receiving body (10), wherein the securing device (20) has a clamping profile (30), the clamping profile (30) having a first leg (31) and a second leg (32) positioned at a right angle to the first leg (31), wherein the first leg (31) is guided linearly in a guide element (21) and a slide (33) is arranged on an upper side of the second leg (32).

2. The fastening device according to claim 1, wherein the clamping profile (30) has an L-shaped design.

3. The fastening device according to claim 1, wherein a plastic element (34) is arranged on an underside of the second leg (32).

4. The fastening device according to claim 3, wherein the slide (33) is connected to a tongue element (35), wherein the tongue element (35) is guided linearly in the plastic element (34).

5. The fastening device according to claim 4, wherein the securing device (20) has a closing element (22), wherein the closing element (22) is provided with a lead-in chamfer (23) and the tongue element (35) latches below the lead-in chamfer (23).

6. The fastening device according to claim 5, wherein the closing element (22) is made of high-grade steel.

7. The fastening device according to claim 1, wherein the securing device (20) has a cover element (36) opposite the guide element (21), wherein the cover element (36) is connected to the guide element (21) and to the receiving body (10).

8. The fastening device according to claim 1, wherein each of the two receiving elements (11) has a hook-shaped design, wherein an upper side of each of the two receiving elements (11) has a bead (12) for rubber inserts.

9. The fastening device according to claim 1, wherein the receiving body (10) has a first end stop (13) and a second end stop (14), wherein the first end stop (13) has a substantially round shape and the second end stop (14) has a narrower design than the first end stop (13).

10. The fastening device according to claim 9, wherein the receiving body (10) has a reinforcing profile (19*a*), wherein a projection (19*b*) is formed on the reinforcing profile (19*a*) and engages with an opening in the first end stop (13).

11. The fastening device according to claim 9, wherein the receiving body (10) has a narrower design along the longitudinal direction (L) towards the first and second end stops (13, 14) than in a region of the securing device (20) and the two receiving elements (11).

12. The fastening device according to claim 1, wherein the at least one fixing device (50) has a first mounting profile (51) and a second mounting profile (52), wherein the second mounting profile (52) is guided linearly in the first mounting profile (51) via a push rod clamping device (53).

13. The fastening device according to claim 1, wherein the receiving body (10) has at least one suspension device (15) on the facing-away side (S2), wherein the at least one suspension device (15) is mounted rotatably and is configured to be fixed in at least three positions.

14. The fastening device according to claim 13, wherein the at least one suspension device (15) is connected to the receiving body (10) via a housing (16).

15. The fastening device according to claim 1, wherein the receiving body (10) has a power supply unit holder (40) with a bracket (41) and a base (42).

16. The fastening device according to claim 1, wherein each of the two receiving elements (11) is hook shaped, wherein the securing device (20) is arranged in a center between the two receiving elements (11).

17. The fastening device according to claim 1, wherein the securing device (20) has a latching mechanism.

* * * * *